Jan. 22, 1924.

J. H. KLEIN 1,481,376

TRAILER TRACTION HITCH

Filed May 18, 1922

Inventor
John H. Klein

By A. J. O'Brien
Attorney

Patented Jan. 22, 1924.

1,481,376

UNITED STATES PATENT OFFICE.

JOHN H. KLEIN, OF DENVER, COLORADO.

TRAILER TRACTION HITCH.

Application filed May 18, 1922. Serial No. 561,879.

*To all whom it may concern:*

Be it known that I, JOHN H. KLEIN, a citizen of the United States, residing at the city and county of Denver and State of Colorado; have invented certain new and useful Improvements in Trailer Traction Hitches; and I do declare the following to be a full, clear, and exact description of the invention such as will enable others skilled in the art to which it appertains to make and use the same, reference being had to the accompanying drawings, and to the characters of reference marked thereon, which form a part of this specification.

This invention relates to a means for hitching a trailer to a tractor so that the force required to pull the latter will be partly resolved into a vertical component, which will tend to force the rear or traction wheels against the roadbed so as to secure the required traction.

In late years interurban transportation by means of trucks has become extensively employed for short hauls and has proven to be both more economical and quicker than railroad transportation. In order to conserve the highways, it has become necessary to limit the load per truck, and this in turn has made it necessary to employ trailers.

I have found that when trailers are employed, the power truck will also have to be loaded in order that the necessary traction shall be secured. The loading and unloading of the power truck consumes a lot of time that could be saved if the goods were all packed on the trailers, as in the latter case a trailer can be loaded with all the goods for a certain station and merely uncoupled and left to be unloaded and loaded for the return trip, while the driver completes the trip and returns.

It is the object of this invention to provide means whereby sufficient traction may be secured to pull the trailers without the necessity of loading the truck, which therefore acts as a tractor. I accomplish the above object by means which I will now describe in detail, reference being had for the purpose to the accompanying drawing, in which—

The same reference numerals will be used to indicate the same parts throughout the several views.

Figure 1:
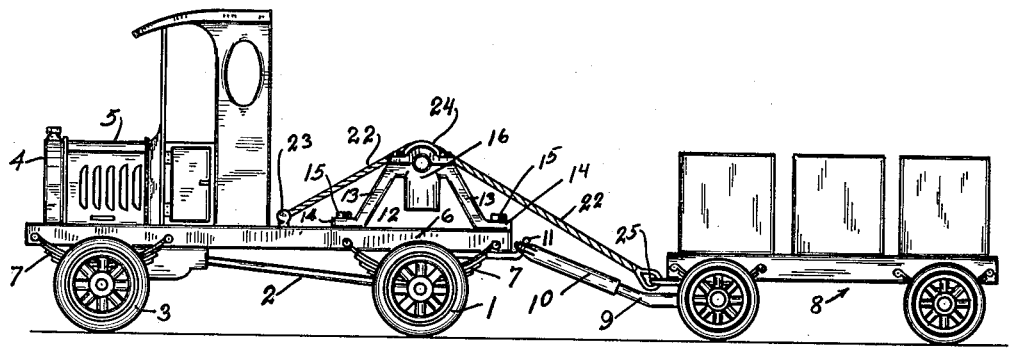
Fig. 1 is a side elevation of a truck and trailer connected by my improved hitch.
Figure 2:
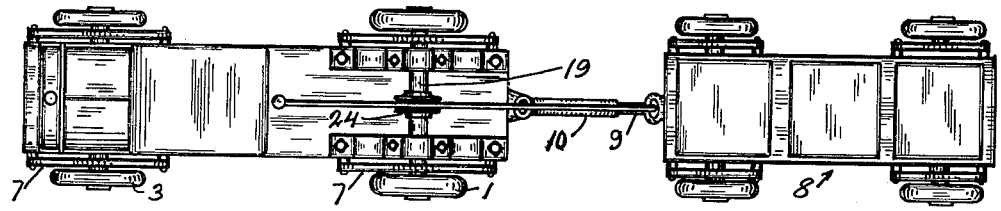
Fig. 2 is a plan view of the parts shown in Fig. 1.

In the various figures I have shown a truck having the usual rear driving wheels 1, torque shaft 2, front wheels 3, radiator 4, hood 5, and chassis 6 which is supported on suitable springs 7. It is my intention to employ the truck as a tractor only and not to use it for carrying any load, the goods to be transported being carried on trailers 8, one of which is shown in the drawing. In order to guide the trailer, I provide a tongue 9 which telescopes with a tubular member 10, the front end of which is secured to the rear of the truck chassis by suitable means such as a hook 11. Members 9, 10 and 11 are not intended to be subjected to any tension, but to serve merely as a guiding means and as a means for backing and holding the trailer back on a down grade.

Figure 5:
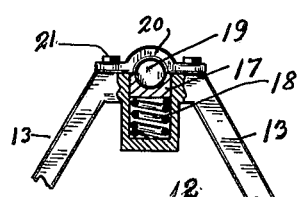
Fig. 5 shows an elevation of one of the supporting brackets, part thereof being shown in section to better illustrate the construction.

The trailer is hitched to the tractor in the manner which I will now describe. On each side of the chassis I secure a bracket 12, having a pair of downwardly and outwardly extending legs 13 terminating in feet 14, which are bolted to the chassis frame by means of bolts 15. The top of each bracket is provided with a bearing 16 which is constructed as shown in Fig. 5. A lower bearing member 17 rests upon a spring 18 and supports the end of a shaft 19, while the upper half 20 of the bearing is held rigidly in place by means of bolts 21. The arrangement of the bearing and cooperating parts is such that shaft 19 may move downwardly when the pressure thereon exceeds a certain limit.

In order to enable the truck to pull the trailer I secure the end of a cable 22 to a suitable bolt or ring 23 that is securely anchored to the truck chassis. The cable then passes over a pulley 24 which is slidably and rotatably mounted on shaft 19. The other end of cable 22 is secured to the trailer as indicated by numeral 25. The pulling of the trailers is all accomplished by the cable 22, while the guiding is done by members 9, 10 and 11. When a turn is made pulley 24 will slide longitudinally on shaft 19 in the manner clearly apparent. It has been customary to depend entirely on means corresponding to members 9, 10 and 11 for pulling as well as for guiding the trailers, but I have found that in that case it was always necessary to load the truck or tractor in order to secure the necessary traction; this entailed a lot of unnecessary work and consumed a lot of valuable time. With my present hitch it is not necessary to carry any load on the tractor, as the pull in cable 22 produces a vertical force which acts as a load and provides the necessary pressure between the wheels and the road to secure the required traction.

Figure 3:
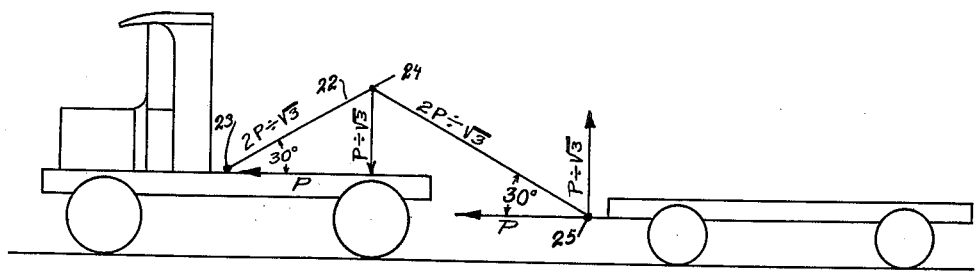
Fig. 3 is a diagram showing the manner in which the pulling force is resolved into various components.
Figure 4:
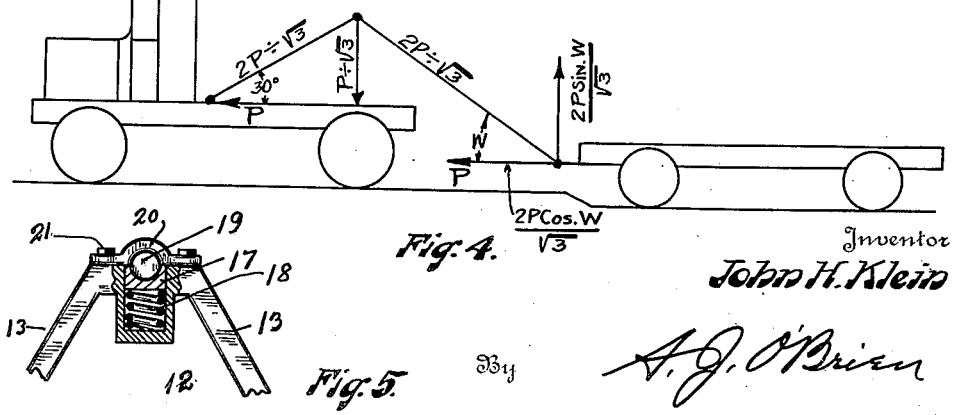
Fig. 4 is a diagram similar to that shown in Fig. 3, but showing the trailer on a lower road level than the truck.

In order to describe my invention as clearly as possible, I have shown two diagrams (Figs. 3 and 4) which show graphically the relationship of the various forces produced. The pull of the tractor is indicated by the letter P, and for convenience sake I have taken the height of the brackets and the distance to the anchor 23 so that cable 22 makes an angle of 30 degrees with the chassis frame, and the distance to the trailer (Fig. 3) is such that the cable slants downwardly at a 30 degree angle. The relationship of the various forces is indicated on the several lines. The vertical component is shown as $$P \div \sqrt{3},$$

and as the square root of 3 is less than 2 or approximately 1.73, it is evident that the downward pressure due to the pulling of the load is more than one-half the pulling force exerted by the tractor. It is also evident that there is a vertical component acting to raise the front end of the trailer which is equal but opposite to the force pressing downwardly on the truck axle; this helps greatly in moving the trailer over the rough places on the road.

When the front end of the trailer drops into a hole in the road or to a lower level than the truck, the angle that the cable makes with the horizontal at the point of connection with the trailer is increased, and this increases the lifting power in proportion to the pull of the tractor.

It is evident from the above that by means of my improved hitch there will always be a downward pressure on the driving wheels of the tractor which is proportional to the pull exerted by the tractor, and that therefore it is not necessary to load the tractor to secure the necessary traction.

Having now described my invention, what I claim is—

1. In combination, a tractor, a trailer, means for guiding the trailer in accordance with the movements of the tractor, and means connecting the trailer and tractor whereby the latter will pull the former, said means comprising a tension member having one end secured to the truck chassis, a bracket secured to the top of the chassis on each side thereof, a shaft connecting the upper portions of said brackets and lying substantially parallel to and vertically over the rear axle, a pulley rotatably and slidably connected to said shaft, the tension member passing over said pulley and having its other end secured to the trailer, whereby the pulling force in said tension member will have a vertical component whose value varies directly with the force required to move the trailer.

2. In combination, a tractor, a trailer, means for guiding the trailer in accordance with the movements of the tractor, and means connecting the trailer and tractor whereby the latter will pull the former, said means comprising a tension member having one end secured to the truck chassis, a bracket secured to the top of the chassis on each side thereof, a bearing in each bracket near the upper end thereof, said bearing having an upper stationary portion and a lower movable portion, a spring upon which the lower bearing portion rests, a shaft mounted in said bearing, a pulley rotatably and slidably connected to said shaft, the tension member passing over said pulley and having its other end secured to the trailer, whereby the pulling force in said tension member will have a vertical component whose value varies directly with the force required to move the trailer.

In testimony whereof I affix my signature.

JOHN H. KLEIN.